(12) United States Patent
Belot et al.

(10) Patent No.: US 7,141,535 B2
(45) Date of Patent: Nov. 28, 2006

(54) LUBRICATING GREASE, PREPARATION AND USE THEREOF, IN PARTICULAR FOR LUBRICATING CONTACTS INVOLVING ELASTOMERS

(76) Inventors: Pierre Belot, 23, rue Joseph Hubert, Mons (BE) B-7000; Jean-Marie Pinoche, 15, rue des Barricodes, Gainneville (FR) F-76700

( * ) Notice: Subject to any disclaimer, the term of this patent is extended or adjusted under 35 U.S.C. 154(b) by 371 days.

(21) Appl. No.: 10/476,564

(22) PCT Filed: May 3, 2002

(86) PCT No.: PCT/FR02/01544

§ 371 (c)(1), (2), (4) Date: Oct. 31, 2003

(87) PCT Pub. No.: WO02/090473

PCT Pub. Date: Nov. 14, 2002

(65) Prior Publication Data

US 2004/0127369 A1 Jul. 1, 2004

(30) Foreign Application Priority Data

May 4, 2001 (FR) .................................. 01 06079

(51) Int. Cl.
*C10M 169/02* (2006.01)
*B60C 17/06* (2006.01)

(52) U.S. Cl. ........................ 508/136; 508/143; 508/308

(58) Field of Classification Search .................... None
See application file for complete search history.

(56) References Cited

U.S. PATENT DOCUMENTS

| 2,652,361 | A |   | 9/1953  | Woods et al. |         |
|-----------|---|---|---------|--------------|---------|
| 2,980,612 | A | * | 4/1961  | Potter       | 508/136 |
| 3,647,690 | A | * | 3/1972  | Cross        | 508/311 |
| 4,298,481 | A | * | 11/1981 | Clarke       | 508/144 |
| 5,236,606 | A |   | 8/1993  | Rangel       |         |

FOREIGN PATENT DOCUMENTS

| EP | 0210356 | 4/1987 |
| EP | 0248188 | 4/1987 |
| EP | 0626420 | 4/2001 |

OTHER PUBLICATIONS

Derwent abstract ACC-No. 1988-177099, for patent ES-8801941A (May 16, 1988).*

* cited by examiner

*Primary Examiner*—Matthew A. Thexton
(74) *Attorney, Agent, or Firm*—Townsend and Townsend and Crew LLP

(57) ABSTRACT

In a particular embodiment, the invention concerns a lubricating grease having 70 to 95 percent by weight of a mixture that includes at least a first ester of fatty acid and of sorbitan, and at least a second ester of fatty acid and of polyoxyalkylated sorbitan. The esters are present in quantities by weight, relative to the weight of the mixture, of 10 to 90 percent and 90 to 10 percent respectively. The grease also includes from 5 to 30 percent by weight of at least one thickening agent.

24 Claims, No Drawings

LUBRICATING GREASE, PREPARATION AND USE THEREOF, IN PARTICULAR FOR LUBRICATING CONTACTS INVOLVING ELASTOMERS

The present invention relates to a lubricating grease, that is to say a lubricating composition that is solid to semi-fluid at ambient temperature and pressure. More precisely, the present invention relates to a grease that is particularly suitable for the lubrication of contacts in which friction occurs between a metal and an elastomer such as rubber for example.

The present invention also aims to propose preparation processes for such a lubricating grease, as well as uses of this grease in applications in which it proves to perform particularly well.

The use of lubricating greases is widespread, and a very large number of compositions have been described in the prior art.

Thus, U.S. Pat. No. 4,298,481 describes a grease containing from 80 to 94% by weight of a base oil constituted by a diester (obtained from C5 to C16 alcohols and hydrogenated C32 to C52 dimeric acids), from 0.2 to 6% by weight of a mixture of additives including, among others, from 0.08 to 2% of an anti-rust agent (preferably sorbitan monooleate) and from 5 to 20% by weight of a thickening agent based on modified clay (preferably bentonite) grafted by organic groups. This grease has the advantage of preserving its properties in the case of prolonged use at high temperatures (above 200° C.), and it is particularly suitable for use in aircraft or rocket engines.

U.S. Pat. No. 3,647,690 describes a lubricating grease constituted by a natural or synthetic base oil, thickened with a lithium soap, and the anti-rust properties of which are improved by incorporation of 2 to 5% by weight of an anti-corrosion agent constituted by a metal salt of naphthenic or aromatic acid combined with a surfactant having a HLB ("hydrophile-lipophile balance") coefficient of between 1 and 6. As surfactant, it is particularly recommended to use alkylated and ethoxylated phenols, or esters of fatty acids and of sorbitol (in particular sorbitol monooleate).

The documents described above thus show that it is known to incorporate in greases small quantities of esters of fatty acids and sorbitan that are to act as anti-corrosion additives.

Moreover, the greases formulations described above have been optimized with a view to improving certain standard properties of greases essentially intended to lubricate contacts between metals. None answers the specific problems raised by the lubrication of contacts involving elastomers.

In a very general way, patent ES 8801941 describes a process for the production of greases with a high dropping point, by thickening various standard fluids to which are added, at a temperature between 5 and 100° C., from 3 to 20% by weight of a silica-based thickener and from 0.3 to 6% by weight of a stabilizing agent. The base fluids can be chosen from nine large families of oils, including, among others, a family of oils based on esters of polyols (containing from 1 to 4 hydroxyl groups) and monoacids (containing from 4 to 20 carbon atoms). The corresponding example (Example 4) describes the production of a grease from an ester of pentaerythritol, a compound which is particularly aggressive vis-à-vis rubbers. Such a grease cannot be used at all for the lubrication of contacts in which an elastomer is involved.

In a general way, the greases known in the prior art are very little suited to the lubrication of friction contacts between a metal and an elastomer. The formulation of a grease suited to this type of application represents a problem which is all the more delicate because the grease must display not only standard properties (such as lubricity, mechanical stability, thermal stability), but also supplementary properties including in particular a good compatibility with elastomers and even, for certain applications, an absence of toxicity and a biodegradability.

Pursuing their research into the formulation of novel lubricating greases, the Applicant has developed a composition which allows the aforementioned problem to be solved. In particular, the Applicant has developed novel compositions of greases based on a mixture of two types of esters of sorbitan in which a thickening agent is incorporated, which have proved to constitute particularly useful products, possessing excellent properties as regards lubricity and mechanical and thermal stability.

Thus, the Applicant has developed a lubricating grease, characterized in that it contains:

from 70 to 95% by weight of a mixture comprising at least a first ester of fatty acid and of sorbitan and at least a second ester of fatty acid and of polyoxyalkylated sorbitan, these esters being present in quantities by weight, relative to the weight of the said mixture, of 10 to 90% and 90 to 10%, respectively; and from 5 to 30% by weight of at least one thickening agent.

The grease according to the present invention has the major advantage of being wholly compatible with elastomers and plastics. It is even particularly suitable for the lubrication of contacts involving this type of materials, for example contacts between metals and elastomers, or between different types of elastomers or plastics.

In addition to this particular property, the grease according to the present invention displays all the standard properties customarily required for greases, including in particular excellent lubricating properties, a very good mechanical stability, a high dropping point, a stable consistency over a large range of temperatures. As a result, this grease can be used to lubricate contacts between very different materials, and its use is not limited to the lubrication of contacts in which elastomers are involved.

Other advantages of the present invention will appear on reading preferred embodiments described in more detail below.

The greater part of the grease according to the present invention is constituted by a mixture of least two types of esters derived from sorbitan. The term sorbitan, well known to a person skilled in the art, describes a cyclic tetraol which is an anhydride of sorbitol and can be obtained by dehydration of the latter. By tetraol is meant a polyol containing 4 hydroxyl groups.

The first ester is obtained by esterification of one or more fatty acids and sorbitan.

The second ester is obtained either by esterification of one or more fatty acids and one or more polyoxyalkylated derivatives of sorbitan, or by polyoxyalkylation of esters of one or more fatty acids and sorbitan. In general, the polyoxyalkyl group contains from 1 to 50, preferably 1 to 30 units. In general, the alkyl unit contains from 1 to 6, preferably 2 to 4 carbon atoms. Preferably, the polyoxyalkyl groups present in the second ester contain at least one polyethoxy group.

Each of the two types of ester can comprise monoesters or polyesters. Preferably, the said esters are chosen in such a way that the mixture of the two types of esters is liquid at 25° C. and atmospheric pressure.

Various fatty acids can feature in the composition of the said esters. Moreover, the fatty acids featuring in the composition of the said first ester can be identical to, or different from, those featuring in the composition of the said second ester. These fatty-acids, which can be linear or branched, saturated or unsaturated, advantageously contain from 6 to 18 carbon atoms, and preferably from 12 to 18carbon atoms. For example, and in a non-limiting way, the said fatty acids can be chosen from lauric, palmitic, stearic, oleic acids.

Preferably, the said first ester comprises sorbitan monooleate. Equally preferably, the said second ester comprises polyethoxylated sorbitan monooleate.

The mixture of the two types of ester contains for example from 20 to 80% by weight, advantageously from 30 to 70% by weight, and preferably from 40 to 60% by weight of the said first ester (ester of fatty acid and of sorbitan), and for example from 20 to 80%, preferably from 30 to 70% by weight and preferably from 40 to 60% by weight of the said second ester (ester of fatty acid and of polyoxyalkylated sorbitan). Even more preferably, the quantities by weight, in the mixture, of each of the two types of esters are more or less equal.

The grease according to the present invention also contains at least one thickening agent, the function of which is to give it its solid texture. The level of thickening agent depends on the hardness desired for the grease, and is between 5 and 30% by weight, and preferably between 10 and 20% by weight. A person skilled in the art will be fully aware how, within this range, to optimize the level of thickening agent in order to obtain the requisite degree of hardness.

Various thickening agents, organic or inorganic, can be used. By way of non-limiting example, the thickening agent can be chosen from lithium soaps, calcium soaps, thickeners based on polyurea, silica, clay.

According to a first preferred embodiment, the thickening agent contains at least a clay grafted by organic groups. Preferably, this clay is bentonite. The term bentonite designates, in a manner known per se, an argillaceous material comprising essentially clays of the smectites group (see "Ullmann's Encyclopedia of Industrial Chemistry", 1986, Vol. A7, Chap. 2,2, p. 116).

This type of clays has the property of swelling in an aqueous medium, and it is customary to modify these clays by grafting on organic groups, in order to obtain materials capable of being dispersed in an organic medium. The grafting is generally carried out by ion exchange, replacing the inorganic ions naturally present on the surface of the clay with ions of alkyl-ammonium type.

According to a second preferred embodiment, the thickening agent contains from 70 to 100% by weight of silica. The term silica designates, in a manner known per se, silicon oxide. The silica used advantageously has a high specific surface, preferably greater than or equal to 150 $m^2/g$. It is particularly advantageous to use a colloidal silica, such as that which is obtained by flame hydrolysis of silicon chloride ($SiCl_4$) in gas phase.

Preferably, a silica is used the composition of which is suited to polar media. The silica-based thickener can also contain up to 30% of other components, which are preferably other oxides. These preferably comprise aluminium oxide.

It is customary to add to silica, when this is used as a thickener for greases, an adjuvant the function of which is to increase the thickening power of the silica, forming hydrogen bonds between the silanol groups present on the surface of the silica particles. The grease according to the invention advantageously contains such an adjuvant, at a level of between 0.5 and 2% by weight relative to the total weight of the grease. By way of non-limiting example, this adjuvant can be chosen from water, glycerol, ethylene glycerol, glycol, ethylene glycol. Polyethoxylated stearates or polystearates of sorbitan, adjuvants known for such an application, can advantageously perform this function of adjuvant while still forming, where appropriate, a part of the mixture of esters constituting the base of the grease (alone or mixed with other esters of polyalkoxylkated fatty acids).

In the two preferred embodiments described above, the grease has the additional advantage of displaying complete respect for the environment. These two formulations of greases are in fact biodegradable, and above all they pose no risk of pollution of the groundwater.

The pollutant character vis-à-vis the groundwater can be quantified by what is called the WGK (from the German "Wasser Gefährdigungsklasse") index, as defined in the German ministerial directive of $18^{th}$ Apr. 1996 (Federal Ministry for Internal Affairs, Federal Ministry for the Environment, Protection of Nature and Reactor Safety; Potential Water Pollution Substances Administrative Order, $18^{th}$ Apr. 1996). The two grease formulae described above, in which the thickener is based on organic bentonite or silica, have a WGK index equal to 1, which reflects their non-pollutant character.

If necessary, the grease according to the present invention can also contain, in addition to the mixture of esters and the thickening agent, a certain number of additives customarily used in lubricating compositions. These additives are generally incorporated in a small quantity, in order to improve some particular properties, according to the application for which the grease is intended.

For example, the grease can advantageously contain from 0.25 to 1.5% by weight of an antioxidant additive, which can chosen from, among others, the standard antioxidant additives which are phenolic or amino-compounds, metal dithiocarbamates, metal dithiophosphates.

Other types of additives can also be incorporated in the grease according to the invention, in particular anti-corrosion additives, anti-rust additives, metal passivators, friction modifiers, adhesion agents, additives improving the pour point.

The grease according to the present invention has a grade which depends of course on the envisaged application. The grade of a grease is, in a manner well known to specialists, usually determined by means of a test called the "cone penetrability test", carried out in accordance with standard ASTM D-217. The grease according to the invention advantageously has a cone penetrability of between 265 and 340 $\frac{1}{10}^{th}$ mm.

Moreover, the dropping point of the grease is preferably high enough to allow it not to liquefy and to continue to perform its function when the temperature increases. For example, the grease preferably resists local increases in temperature which are sometimes large, and which are due to the heating phenomena associated with the frictions between the materials in contact.

Thus, the grease according to the invention advantageously has a dropping point which is greater than or equal to 200° C., and which can be for example of the order of 260° C. In the present description the quoted dropping points are measured in accordance with standard IP-396.

The greases according to the present invention can be prepared in various ways. An advantageous procedure is to carry out a first stage of mixing the said first and second esters (ester of fatty acid and of sorbitan and ester of fatty acid and of polyoxyalkylated sorbitan), followed by a second, thickening, stage comprising the incorporation of the thickening agent and the mixture in conditions suitable for bringing about thickening.

The conditions in which the second, thickening, stage is carried out depend on the type of thickener used and the required grade.

In particular, when the thickening agent is based on bentonite grafted by organic groups, it is customary to use a swelling agent of polar type, which allows the swelling of the bentonite to be facilitated by deploying the organic chains grafted on its surface. Various compounds can be used to this end, for example water, an alcohol, acetone, propylene carbonate. The quantity of swelling agent used is preferably of the order of approximately 10% relative to the weight of the grafted bentonite.

The thickening stage can thus be carried out in the following manner:

dispersion of the grafted bentonite in the liquid mixture of the two esters, at a temperature of 30 to 60° C. and accompanied by stirring, heating to a temperature of 30 to 60° C., and, at this temperature, addition of a swelling agent in a quantity of between 5 and 20% by weight relative to the weight of bentonite, stirring at a temperature of 30 to 60° C. at a high shear rate, for 1 to 4 hours, incorporation of any additives, final mixing by grinding in a colloidal mill.

On the other hand, when the thickening agent is based on silica, the thickening stage can be carried out in the following manner:

dispersion of the silica in the liquid mixture of the two esters, at a temperature of 30 to 80° C. and accompanied by stirring;

incorporation of any adjuvant in a quantity of from 0.5 to 2% by weight relative to the weight of the grease;

mixing at a temperature of 30 to 80° C. at a high shear rate for 1 to 4 hours, incorporation of any additives and final mixing.

A person skilled in the art will easily be able to determine the optimum shearing and grinding conditions, according to the components and the equipment used, the sought final hardness, etc., on the basis of his general knowledge.

Thanks to its excellent properties, the grease that is the subject of the present invention can be used as a lubricant in extremely varied applications. It allows the lubrication with a very good effectiveness of the contacts in which very different materials, metal or not, can be involved.

Thanks to its compatibility with elastomers, the grease according to the invention is particularly suitable for the lubrication of contacts involving one or more materials based on elastomers, synthetic or natural (for example rubber), even plastics.

An application example in which the grease according to the invention performs particularly well concerns the lubrication of metal-rubber friction contacts likely to occur in anti-rim-roll-off systems for tyres. Some of these systems are based on the presence, between the tyre and the rim, of a steel boss on which the tyre comes to rest in the event of a puncture, which on the one hand allows rolling off from the rim to be avoided and on the other allows driving to continue without the need to change the wheel at once. The vehicle can thus travel a further distance of up to 200 km, at a maximum speed of 80 km.h$^{-1}$.

However, such a system is effective only insofar as the contact between the metal boss and the rubber tyre is adequately lubricated, in order to avoid a too rapid destruction of the tyre by friction and heating on contact with the boss. The grease according to the invention represents a particularly suitable solution to this problem: compatible with the rubbers of which tyres are made, it allows an effective lubrication to be ensured between the tyre and the boss. It is thus sufficient to place a layer of grease on the outer surface of the anti-rim-roll-off boss and/or on the inner surface of the tyre. Since the grease according to the invention can have a high dropping point, it can remain solid at the maximum temperatures (of the order of 160° C.) that are likely to be reached inside a tyre during normal operation (that is to say not punctured). Thus, the layer of grease does not liquefy, and remains in place without degrading throughout the life of the tyre until the time of any puncture (from which moment on it starts to perform its function of lubricant).

Thus, the invention also provides a vehicle wheel comprising a tyre and a rim, and between them a metal boss on which the tyre comes to rest in the event of a puncture, and also containing on the outer surface of the boss and/or on the inner surface of the tyre a grease according to the invention.

The following examples, which are not limitative in character, are intended solely to illustrate the implementation of the invention and the advantages of the latter.

EXAMPLES

Preparation of Greases According to the Invention:

Grease 1 (Thickened with Lithium Soap):

326 g of sorbitan monooleate and 326 g of polyethoxylated sorbitan monooleate (POE20) are introduced into a mixer. 180 g of 12-hydostearic acid are then added, and the mixture is heated until the acid melts, then 144 g of a 10% solution of lithium hydroxide are added. The mixture is then heated to 195° C., then cooled to 80° C. by adding 652 g of the mixture of sorbitan/polyethoxylated sorbitan 50/50 by weight. The grease is then ground in a Fryma colloid mill.

Grease 2 (Thickened with Organic Clay):

582 g of sorbitan monooleate and 582 g of polyethoxylated sorbitan monooleate are introduced into a mixer. 270 g of organomodified bentonite are added, which is dispersed for 1 hour, at ambient temperature, in the mixture of the two esters of sorbitan. 30 g of propylene carbonate are then added, and the mixture is raised to a temperature of 45° C., mixing with a controlled shearing rate. The product is mixed at this temperature until it thickens, after which it is ground in a Fryma colloid mill.

Grease 3 (Thickened with Silica)

652 g of sorbitan monooleate and 652 g of polyethoxylated sorbitan monooleate are introduced into a mixer. The mixture is raised to 65° C., and 15 g of Tween 65 (silica-stabilizing agent) are added, then, after 15 minutes, 180 g of a silica of a composition suited to polar media. The whole is mixed at 65° C. until it thickens.

Properties and Performances of the Greases According to the Invention:

Table 1 below lists the characteristic properties of the above greases 1 to 3.

TABLE 1

|  | Grease 1 | Grease 2 | Grease 3 | Grease 4 |
|---|---|---|---|---|
| PO (in 1/10$^{th}$ mm) | 320 | 288 | 286 | 303 |
| P60 (in 1/10$^{th}$ mm) | 332 | 302 | 310 | 314 |
| P100,000 – P60 (in 1/10$^{th}$ mm) | 26 | 42 | 46 | / |
| Dropping point | 195° C. | >300° C. | >300° C. | 195° C. |

Where:

PO=cone penetrability of the grease, unworked (standard ASTM-D 217)

P60=cone penetrability of the grease, worked, 60 hits (standard ASTM-D 217)

P100,000=cone penetrability of the grease, worked, 100,000 hits (standard ASTM-D 217)

The difference P100,000–P60 characterizes the mechanical stability of the grease. The dropping point is measured in accordance with standard IP-396.

Grease 4 is a commercial grease mentioned here as a reference. It is constituted by a polyglycol base thickened with lithium soap, and is currently marketed among other things for the lubrication of contacts involving elastomers.

The above results show that greases 1 to 3 according to the invention present a good mechanical stability and a high dropping point, with values analogous to those of the reference grease.

The performances in terms of lubricating power of greases 1 to 4 were determined by tests carried out using a Cameron Plint TE77 reciprocating tribometer, the operating principle of which is for example described in the publication "Test Procedure for Rapid Assessment of Frictional Properties of Engine Oils at Elevated Temperature", A. G. Plint, M. A. Plint, Tribology International, Vol. 17. No. 4, August 1984, pp. 209–213.

These tests were carried out with testpieces made of materials representative of the metal/elastomer lubrication application, at a sliding velocity and initial pressure that were constant and representative of the service, and for various temperature conditions and periods.

Table II below expresses, in terms of average values of friction coefficients (μ) for long-duration tests at 80° C., the relative behaviour of the 4 greases chosen as examples.

The lower the friction coefficient, the greater the lubricating power of the grease.

TABLE II

|  | Grease 1 | Grease 2 | Grease 3 | Grease 4 |
|---|---|---|---|---|
| $\mu_{maximum}$ (start of test) | 0.127 | 0.158 | 0.147 | 0.142 |
| $\mu_{average}$ between 4$^{th}$ and 14$^{th}$ minutes of test | 0.038 | 0.031 | 0.035 | 0.054 |
| $\mu_{average}$ beyond 14 minutes of test | 0.035 | 0.027 | 0.027 | 0.050 |

These results illustrate the excellent performances of the greases that are the subject of the present invention. Greases 1 to 3 have an excellent lubricating power, which at the end of a few minutes of the test stabilizes at a level clearly better than that of the reference grease (grease 4).

The invention claimed is:

1. Lubricating grease, characterized in that it contains:
from 70 to 95% by weight of a mixture comprising at least a first ester of fatty acid and of sorbitan and at least a second ester of fatty acid and of polyoxyalkylated sorbitan, these esters being present in quantities by weight, relative to the weight of the said mixture, of 10 to 90% and 90 to 10%, respectively; and
from 5 to 30% by weight of at least one thickening agent.

2. Grease according to claim 1, characterized in that the mixture of the two types of esters contains from 30 to 70% by weight, preferably from 40 to 60% by weight, of the said first ester, and from 70 to 30% by weight, preferably from 60 to 40% by weight, of the said second ester.

3. Grease according to claim 1, characterized in that the quantities by weight in the mixture of each of the two types of esters are more or less equal.

4. Grease according to claim 1, characterized in that said first and second esters are chosen in such a way that the mixture of the two types of esters is liquid at 25° C. and atmospheric pressure.

5. Grease according to claim 1, characterized in that the fatty acids featuring in the composition of said first and second esters contain from 6 to 18 carbon atoms.

6. Grease according to claim 1, characterized in that the fatty acids featuring in the composition of the said first and second esters are chosen from lauric, palmitic, stearic, oleic acids.

7. Grease according to claim 1, characterized in that the polyoxyalkyl groups present in the said second ester contain at least one polyethoxy group.

8. Grease according to claim 1, characterized in that the said first ester comprises sorbitan monooleate.

9. Grease according to claim 1, characterized in that the said second ester comprises polyethoxylated sorbitan monooleate.

10. Grease according to claim 1, characterized in that the thickening agent contains at least a clay grafted by organic groups.

11. Grease according to claim 1, characterized in that the said clay is bentonite.

12. Grease according to claim 1, characterized in that the thickening agent contains 70 to 100% by weight of silica.

13. Grease according to claim 12, further comprising from 0.5 to 2 % by weight of an adjuvant, the function of which is to increase the thickening power of the silica.

14. Grease according to claim 13, characterized in that the adjuvant is chosen from water, glycerol, ethylene glycerol, glycol, ethylene glycol.

15. Grease according to claim 1, characterized in that the thickening agent content is between 10 and 20% by weight.

16. Grease according to claim 1, further comprising 0.25 to 1.5% by weight of an antioxidant additive.

17. Grease according to claim 1, characterized in that its cone penetrability is between 265 and 340 $\frac{1}{10}^{th}$ mm.

18. Preparation process for a grease according to claim 1, characterized in that it comprises a first stage of mixing the said first and second esters, and a second, thickening, stage comprising the incorporation of the thickening agent and the mixture in conditions suitable for bringing about thickening.

19. Preparation process according to claim 18, in which the thickening agent is based on bentonite grafted by organic groups, characterized in that the thickening stage is carried out in the following manner:
dispersion of the grafted bentonite in the liquid mixture of the two esters, at a temperature of 30 to 60° C. and accompanied by stirring,
heating to a temperature of 30 to 60° C., and, at this temperature, addition of a swelling agent in a quantity of between 5 and 20% by weight relative to the weight of bentonite,
stirring at a temperate of 30 to 60° C. at a high shear rate, for 1 to 4 hours, incorporation of any additives, final mixing by grinding in a colloid mill.

20. Preparation process according to claim 18, in which the thickening agent is based on silica, characterized in that the thickening stage is carried out in the following manner;

dispersion of the silica in the liquid mixture of the two esters, at a temperature of 30 to 80° C. and accompanied by stirring;

incorporation of any adjuvant in a quantity of from 0.5 to 2% by weight relative to the weight of the grease;

mixing at a temperature of 30 to 80° C. at a high shear rate, for 1 to 4 hours, incorporation of any additives and final mixing.

21. A vehicle wheel comprising a tire on a rim, and between the tire and the rim a metal boss on which the tire comes to rest in the event of a puncture, and also containing on the outer surface of the boss and/or on the inner surface of the tire a grease according to claim 1.

22. A method for lubricating, comprising:

providing a grease comprising from 70 to 95% by weight of a mixture comprising at least a first ester of fatty acid and of sorbitan and at least a second ester of fatty acid and of polyoxyalkylated sorbitan, these esters being present in quantities by weight, relative to the weight of the said mixture, of 10 to 90% and 90 to 10%, respectively; and from 5 to 30% by weight of at least one thickening agent;

placing the grease between two materials.

23. A method according to claim 22, wherein the materials are included in an anti-rim-roll-off system for tires, and wherein the grease is placed in the anti-rim-roll-off system.

24. A method according to claim 22, wherein the materials are selected from a group consisting of elastomers, synthetic or natural, and plastics.

* * * * *